(12) United States Patent
Yan et al.

(10) Patent No.: US 9,538,527 B2
(45) Date of Patent: Jan. 3, 2017

(54) METHOD FOR DETERMINING TRANSMISSION TIME INTERVAL, BASE STATION, AND RADIO NETWORK CONTROLLER

(71) Applicant: HUAWEI TECHNOLOGIES CO., LTD., Shenzhen, Guangdong (CN)

(72) Inventors: Kun Yan, Shenzhen (CN); Yanyan Chen, Shenzhen (CN); Bingzhao Li, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 92 days.

(21) Appl. No.: 14/243,896

(22) Filed: Apr. 3, 2014

(65) Prior Publication Data

US 2014/0211769 A1 Jul. 31, 2014

Related U.S. Application Data

(63) Continuation of application No. PCT/CN2012/084097, filed on Nov. 5, 2012.

(30) Foreign Application Priority Data

Nov. 4, 2011 (CN) .......................... 2011 1 0347629

(51) Int. Cl.
*H04L 1/00* (2006.01)
*H04W 72/04* (2009.01)
(Continued)

(52) U.S. Cl.
CPC ......... *H04W 72/0446* (2013.01); *H04W 28/18* (2013.01); *H04W 72/02* (2013.01); *H04W 72/0433* (2013.01)

(58) Field of Classification Search
CPC .......... H04L 47/10; H04L 47/11; H04L 47/12; H04L 47/13; H04L 47/14; H04W 72/0446; H04W 72/0447; H04W 72/0448
(Continued)

(56) References Cited

U.S. PATENT DOCUMENTS

2009/0034474 A1* 2/2009 Yavuz ................... H04L 1/0007
370/331
2011/0280212 A1 11/2011 Lv
(Continued)

FOREIGN PATENT DOCUMENTS

CN 1852049 A 10/2006
CN 101174886 A 5/2008
(Continued)

OTHER PUBLICATIONS

3GPP TS 25.433 V10.4.0,3rd Generation Partnership Project-;Technical Specification Group Radio Access Network; UTRAN lub interface Node B Application Part (NBAP)signalling(Release 10),Sep. 2011,total 1276 pages.
(Continued)

*Primary Examiner* — Dady Chery
(74) *Attorney, Agent, or Firm* — Huawei Technologies Co., Ltd

(57) ABSTRACT

Embodiments of the present application provide a method for determining a transmission time interval, a base station, and a radio network controller. A base station receives uplink data sent from a user equipment in an idle state or a cell forward access channel state on an enhanced dedicated transmission channel. The base station determines a transmission time interval (TTI) used by the user equipment for sending the uplink data, and sends the uplink data and a transmission time interval indicator in an enhanced dedicated transmission channel data frame to a radio network
(Continued)

controller. The radio network controller acquires the TTI, thereby ensuring that the radio network controller selects and configures an appropriate TTI for the user equipment when the user equipment transits from the Cell_FACH state to the Cell_DCH state.

13 Claims, 6 Drawing Sheets

(51) Int. Cl.
*H04W 72/02* (2009.01)
*H04W 28/18* (2009.01)

(58) Field of Classification Search
USPC .............. 370/229–235, 310–337, 503–520
See application file for complete search history.

(56) References Cited

U.S. PATENT DOCUMENTS

| 2012/0039182 A1 | 2/2012 | Zhou et al. |
| 2014/0321286 A1 | 10/2014 | Yavuz et al. |
| 2014/0341195 A1 | 11/2014 | Yan et al. |

FOREIGN PATENT DOCUMENTS

| CN | 101237270 A | 8/2008 |
| CN | 101663852 A | 3/2010 |
| CN | 102084711 A | 6/2011 |
| EP | 2143224 A1 | 1/2010 |
| EP | 2418885 A1 | 2/2012 |
| JP | 2010278588 A | 12/2010 |
| RU | 2009142811 A | 5/2011 |
| WO | 2008131262 A1 | 10/2008 |
| WO | 2010101808 A1 | 9/2010 |
| WO | 2010124438 A1 | 11/2010 |
| WO | 2010124465 A1 | 11/2010 |
| WO | 2011059300 A2 | 5/2011 |

OTHER PUBLICATIONS

3GPP TSG-RAN WG2 Meeting#75bis R2-115097,"On the common E-DCH resource in 2/10 ms TTI concurrent operation",Alcatel-Lucent et al.,Oct. 10-14, 2011,total 4 pages.
3GPP TSG RAN WG2 Meeting#75-BIS R2-114932,"On concurrent deployment of 2ms and 10ms TTI in a cell in CELL_FACH",Qualcomm Incorporated,Oct. 10-14, 2011,total 18 pages.
3GPP TSG RAN WG2 #75bis R2-114997,"Support concurrent deployment of 2ms and 10ms TTI in a cell",Huawei, Hisilicon,Oct. 10-14, 2011,total 4 pages.
3GPP TSG RAN WG2 #75 R1-113968,"Support concurrent deployment of 2ms and 10ms TTI in a cell",Huawei, HiSilicon, Aug. 22-26, 2011,total 3 pages.
3GPP TS 25.435 V10.3.0; 3rd Generation Partnership Project; Technical Specification Group Radio Access Network; UTRAN Iub interface user plane protocols for Common Transport Channel data streams; (Release 10); Sep. 2011; total 61 pages.
3GPP TS 25.331 V10.3.1; 3rd Generation Partnership Project; Technical Specification Group Radio Access Network; Radio Resource Control (RRC); Protocol specification (Release 10); Apr. 2011; total 1863 pages.
3GPP TS 25.321 V10.4.0; 3rd Generation Partnership Project; Technical Specification Group Radio Access Network; Medium Access Control (MAC) protocol specification (Release 10); Sep. 2011; total 198 pages.
3GPP TS 25.319 V11.1.0; 3rd Generation Partnership Project; Technical Specification Group Radio Access Network; Enhanced uplink; Overall description; Stage 2 (Release 11); Sep. 2011; total 83 pages.

* cited by examiner

METHOD FOR DETERMINING TRANSMISSION TIME INTERVAL, BASE STATION, AND RADIO NETWORK CONTROLLER

CROSS-REFERENCE TO RELATED APPLICATIONS

This application is a continuation of International Application No. PCT/CN2012/084097, filed on Nov. 5, 2012, which claims priority to Chinese Patent Application No. 201110347629.X, filed on Nov. 4, 2011, both of which are hereby incorporated by reference in their entireties.

TECHNICAL FIELD

The present application relates to the field of communications technologies, and in particular, to a method for determining a transmission time interval, a base station, and a radio network controller.

BACKGROUND

In a universal mobile telecommunication system (UMTS), a feature of enhanced uplink transmission in an idle or a cell forward access channel (Cell_FACH) state is introduced for a user equipment (UE) in the idle state or the Cell_FACH state, and an enhanced dedicated channel (E-DCH) is used to replace a random access channel (RACH). The UE in the idle state or the Cell_FACH state may send uplink data to a base station (NodeB) by using acquired uplink common E-DCH resources at a pre-configured transmission time interval (TTI).

At an Iub interface between the NodeB and a radio network controller (RNC), the NodeB sends the uplink data of the UE to the RNC through an E-DCH data frame. The E-DCH data frame is used to bear a media access control (MAC) protocol data unit (MAC PDU) of the UE in the Cell-FACH state or the idle state. For the UE in the Cell-FACH state or the idle state, when the TTI length is configured to be 2 milliseconds (ms), the RNC may configure, by configuring a bundling mode indicator information element of a common media access control flow (common MAC flow), a sending mode of the E-DCH data frame of the common MAC flow at the Iub interface.

If a physical shared channel reconfiguration request includes the bundling mode indicator, and the UE uses the 2 ms TTI, the NodeB sends the relevant uplink common MAC flow according to the bundling mode indicator.

In the prior art, for the enhanced uplink transmission feature, each cell can be configured with only one uplink TTI, and the UE, when transmitting the uplink data, can use only the 2 ms TTI or a 10 ms TTI, and therefore, the RNC may acquire the TTI used by the UE in each cell.

However, in a subsequent evolved version, it is possible that each cell is configured with two TTIs, that is, in the same cell, a UE supporting enhanced uplink transmission may dynamically select the 2 ms TTI or the 10 ms TTI for transmitting uplink data. The TTI selection may be performed according to a location where the UE is located. For example, when the UE is located at the edge of a cell and power is limited, the UE may use the 10 ms TTI to enhance coverage of the uplink; when the UE is located at the middle of the cell and the power is sufficient, the UE may use the 2 ms TTI to increase a transmission rate of the uplink. In this scenario, the RNC cannot acquire the TTI used by the UE in the Cell-FACH state or the idle state when transmitting the uplink data, and as a result, when the UE transits from the Cell-FACH state to the cell dedicated transmission channel (Cell-DCH) state, the RNC cannot select and configure an appropriate TTI for the UE.

SUMMARY

Various aspects of the present application provide a method for determining a transmission time interval, a base station, and a radio network controller. The radio network controller acquires a transmission time interval used by a user equipment in idle state or cell forward access channel state when sending uplink data by using the method set forth in embodiments of the present application.

One aspect of the present application provides a method for transmitting a transmission time interval. The method includes: receiving, by a base station, uplink data sent from a user equipment in idle state or cell forward access channel state on an enhanced dedicated transmission channel; determining, by the base station, a transmission time interval used by the user equipment for sending the uplink data; and sending, by the base station, the uplink data in an enhanced dedicated transmission channel data frame to a radio network controller, where the enhanced dedicated transmission channel data frame carries a transmission time interval indicator indicating to notify the radio network controller of the transmission time interval used by the user equipment for sending the uplink data.

Another aspect of the present application further provides a method for determining a transmission time interval, which includes: receiving, by a base station, uplink data sent from a user equipment in idle state or cell forward access channel state on an enhanced dedicated transmission channel; determining, by the base station, a transmission time interval used by the user equipment for sending the uplink data; and sending, by the base station, the uplink data in an enhanced dedicated transmission channel data frame to a radio network controller through a transmission bearer corresponding to the transmission time interval, so that the radio network controller determines, according to the transmission bearer, the transmission time interval used by the user equipment for sending the uplink data.

Another aspect of the present application further provides a method for determining a transmission time interval, which includes: receiving, by a radio network controller, an enhanced dedicated transmission channel data frame from a base station, where the enhanced dedicated transmission channel data frame carries uplink data sent from a user equipment in an idle state or a cell forward access channel state; and determining, by the radio network controller, a transmission time interval used by the user equipment when sending the uplink data according to information carried in the enhanced dedicated transmission channel data frame or a transmission bearer the base station uses for transmitting the enhanced dedicated transmission channel data frame.

Another aspect of the present application further provides a base station, which includes: a receiver, configured to receive uplink data sent from a user equipment in an idle state or a cell forward access channel state on an enhanced dedicated transmission channel; a processor, configured to determine a transmission time interval used by the user equipment for sending the uplink data; and a transmitter, configured to send the uplink data in an enhanced dedicated transmission channel data frame to a radio network controller, where the enhanced dedicated transmission channel data frame carries a transmission time interval indicator indicating to notify the radio network controller of the transmission time interval used by the user equipment for sending the uplink data.

Another aspect of the present application further provides a base station, which includes: a receiver, configured to receive uplink data sent from a user equipment in idle state or cell forward access channel state on an enhanced dedicated transmission channel; a processor, configured to determine a transmission time interval used by the user equipment for sending the uplink data; and a transmitter, configured to send the uplink in an enhanced dedicated transmission channel data frame to a radio network controller through a transmission bearer corresponding to the transmission time interval, so that the radio network controller determines, according to the transmission bearer, the transmission time interval used by the user equipment for sending the uplink data.

Another aspect of the present application further provides a radio network controller, which includes: a receiver, configured to receive an enhanced dedicated transmission channel data frame from a base station, where the enhanced dedicated transmission channel data frame carries uplink data sent from a user equipment in an idle state or a cell forward access channel state; and a processor, configured to determine a transmission time interval used by the user equipment when sending the uplink data according to information carried in the enhanced dedicated transmission channel data frame or a transmission bearer the base station uses for transmitting the enhanced dedicated transmission channel data frame.

According to the embodiments of the present application, a radio network controller may determine, according to a transmission time interval indicator carried in an enhanced dedicated transmission channel data frame or according to a transmission bearer for sending the enhanced dedicated transmission channel data frame, a transmission time interval used by a user equipment in idle state or cell forward access channel state when sending uplink data, thereby ensuring that the radio network controller selects and configures a suitable transmission time interval for the user equipment when the user equipment transits from the cell forward access state to the cell dedicated transmission channel state.

BRIEF DESCRIPTION OF DRAWINGS

To illustrate the technical solutions according to the embodiments of the present application or in the prior art more clearly, the accompanying drawings for describing the embodiments or the prior art are introduced briefly in the following. Apparently, the accompanying drawings in the following description are only some embodiments of the present application, and persons of ordinary skill in the art can derive other drawings from the accompanying drawings without creative efforts.

DETAILED DESCRIPTION

Figure 1:
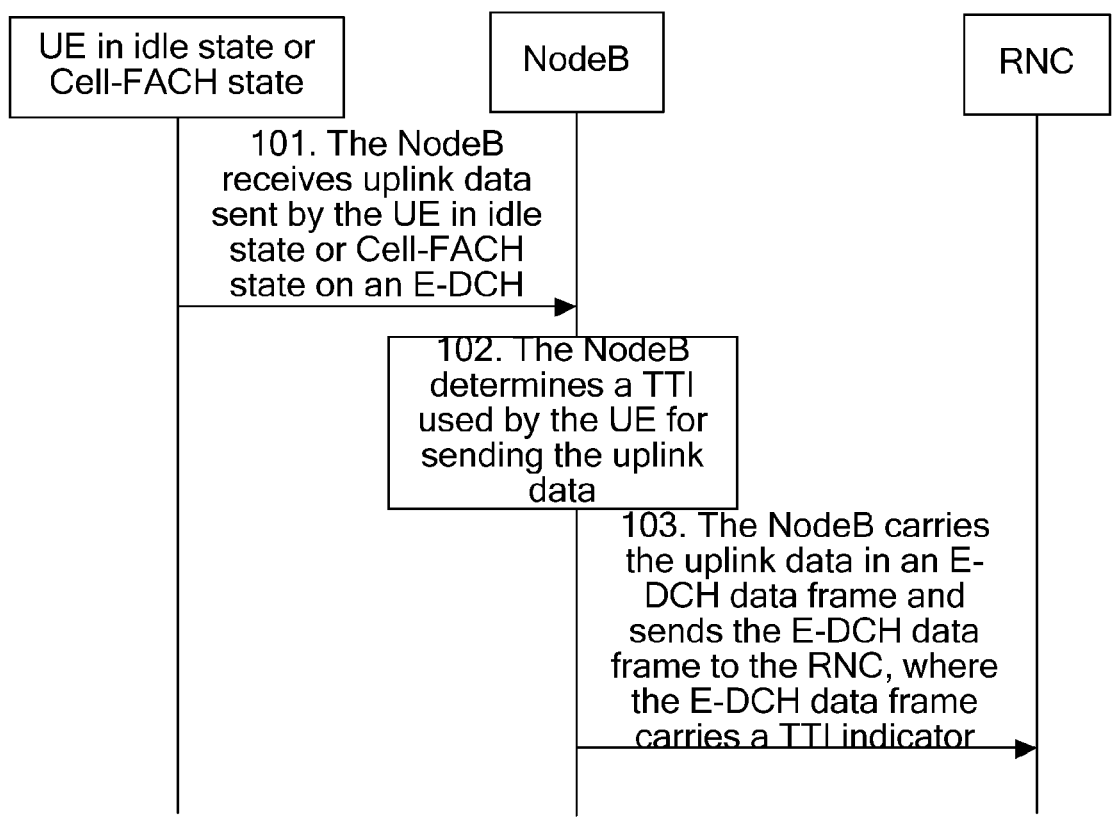
FIG. 1 is a flowchart of an embodiment of a method for determining a transmission time interval according to an embodiment of the present application.

To make the objectives, technical solutions, and advantages of the embodiments of the present application more comprehensible, the following describes the technical solutions in the embodiments of the present application with reference to the accompanying drawings. Apparently, the described embodiments are merely a part of the embodiments of the present application rather than all of the embodiments. All other embodiments obtained by persons of ordinary skill in the art based on the embodiments of the present application without creative efforts shall fall within the protection scope of the present application.

Technologies described in this text may be used in various wireless communication systems, for example, the current second generation (2G) mobile communication system, third generation (3G) mobile communication system, and next and further generation communication systems. For example, the wireless communication system may be a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single carrier-FDMA (SC-FDMA) system, a general packet radio service (GPRS) system, a long term evolution (LTE) system, and other communication systems of similar nature.

In this text, various aspects of the present application are described in combination of a terminal and/or a base station and/or a base station controller.

A user equipment may be a wireless terminal or a wired terminal, where the wireless terminal may refer to a device providing audio and/or data connectivity for a user, a handheld device having a wireless connection function, or another processing device connected to a wireless modem. The wireless terminal may communicate with one or more core networks through a radio access network (RAN). The wireless terminal may be a mobile terminal, for example, a mobile phone (or referred to as a "cellular" phone), or a computer having a mobile terminal, for example, a portable, pocket, handheld, computer-embedded, or vehicle-mounted mobile apparatus, which exchange language and/or data with the radio access network. For example, the wireless terminal may be a device such as a personal communication service (PCS) phone, a cordless phone, a session initiation protocol (SIP) phone, a wireless local loop (WLL) station, and a personal digital assistant (PDA). The wireless terminal may also be called a system, a subscriber unit, a subscriber station, a mobile station, a mobile, a remote station, an access point, a remote terminal, an access terminal, a user terminal, a user agent, a user device, a user equipment, or the like.

A base station (for example, an access point) may refer to a device, in an access network, that communicates with a wireless terminal through one or more sectors at an air interface. The base station may be configured to perform inter-conversion on a received air frame and an Internet protocol (IP) packet, and may be used as a router between the wireless terminal and another part of the access network, where the another part of the access network may include an IP network. The base station may further coordinate attribute management on the air interface. For example, the base station may be a base station (BTS) in the GSM or CDMA, or a base station (NodeB) in the WCDMA, or an evolved base station (NodeB, eNB, or e-NodeB) in the LTE, which is not limited in the present application. The eNB or e-NodeB is an abbreviation of an evolved base station (evolved NodeB).

A base station controller may be a base station controller (BSC) in the GSM or CDMA, or a radio network controller (RNC) in the WCDMA, which is not limited in the present application.

In addition, terms "system" and "network" may be used interchangeably in this text. The term "and/or" in this text only describes an association of associated objects, and indicates three relationships, for example: A and/or B may indicate the following three conditions: A exists solely, A and B exist at the same time, and B exists solely. In addition, a character "/" in this text generally indicates that the former and later associated objects are in an "or" relationship.

FIG. 1 is a flow chart of a method for determining a transmission time interval according to an embodiment of the present application, and as shown in FIG. 1, the method for determining a transmission time interval may be described as follows:

101: A NodeB receives uplink data sent from a UE in an idle state or a Cell-FACH state on an E-DCH.

102: The NodeB determines a TTI used by the UE for sending the uplink data.

For example, the UE reports to the NodeB, in an uplink random access stage through a preamble signature, the TTI used by the UE during the uplink transmission; so that the NodeB, after receiving the uplink data sent from the UE on the E-DCH, determines the TTI used by the UE for sending the uplink data. Certainly, this is only one example of the NodeB determining the TTI used by the UE for sending the uplink data, and the manner of the NodeB determining the TTI used by the UE for sending the uplink data is not limited in the present application.

103: The NodeB carries the uplink data in an E-DCH data frame, and sends the E-DCH data frame to an RNC, where the E-DCH data frame carries a TTI indicator, so as to notify the RNC of the TTI used by the UE for sending the uplink data.

In this embodiment, the NodeB may indicate, by using a new information element (IE) flag, that a space extension field of the E-DCH data frame includes the TTI indicator.

For example, when a value of bit 1 of the new IE flag is set to "1", it indicates that the TTI indicator exists, and when the value of Bit 1 of the new IE flag is set to "0", it indicates that the TTI indicator does not exist. Certainly, the foregoing description is only an example, and the present application is not limited thereto. It is also possible that when the value of Bit 1 of the new IE flag is set to "0", it indicates that the TTI indicator exists, and when the value of Bit 1 of the new IE flag is set to "1", it indicates that the TTI indicator does not exist. Alternatively, whether the TTI indicator exists may be indicated by setting the value of Bit 1 of the new IE flag to another numeral, character and/or character string. In addition, whether the TTI indicator exists may also be indicated by setting a value of another bit other than Bit 1 of the new IE flag, and a manner for setting the other bit is the same as the manner for setting Bit 1, which is not repeated herein. The manner for setting the new IE flag is not limited in this embodiment of the present application, as long as the new IE flag is capable of indicating whether the TTI indicator exists.

In this embodiment, the TTI indicator is used to indicate that the TTI used by the UE for sending the uplink data is a first TTI or a second TTI, where the first TTI is a 2 ms TTI, and the second TTI is a 10 ms TTI; or the first TTI is a 10 ms TTI, and the second TTI is a 2 ms TTI; this is not limited in this embodiment of the present application, but the description of the following embodiment of the present application takes the first TTI being the 2 ms TTI and the second TTI being the 10 ms TTI as an example.

For example, it is possible that when the TTI indicator is set to "1", it indicates that the UE uses the 2 ms TTI when sending the uplink data, and when the TTI indicator is set to "0", it indicates that the UE uses the 10 ms TTI when sending the uplink data. Certainly, the foregoing is only an example, and this embodiment of the present application is not limited thereto, It is also possible that when the TTI indicator is set to "0", it indicates that the UE uses the 2 ms TTI when sending the uplink data, and when the TTI indicator is set to "1", it indicates that the UE uses the 10 ms TTI when sending the uplink data. Alternatively, whether the UE uses the 2 ms TTI or the 10 ms TTI when sending the uplink data may be indicated by setting the TTI indicator to another numeral, character and/or character string. The manner for setting the TTI indicator is not limited in this embodiment of the present application, as long as the TTI indicator is capable of indicating whether the UE uses the 2 ms TTI or the 10 ms TTI when sending the uplink data.

In this embodiment, the NodeB may carry the TTI indicator in one of the following manners: (1) in each E-DCH data frame; (2) during each uplink E-DCH transmission process of the UE, the NodeB carries the TTI indicator only in the first E-DCH data frame; and (3) when a total buffer size in scheduling information (SI) reported by the UE exceeds a preset threshold, the NodeB carries the TTI indicator in the E-DCH data frame.

One "uplink E-DCH transmission" refers to that the UE initiates an E-DCH transmission, acquires, through conflict contention solution, a common E-DCH used for uplink data transmission, and performs common E-DCH resources release after the uplink data transmission is completed or under control of the NodeB.

The preset threshold may be set by the NodeB according to software and hardware processing capabilities thereof, or may be configured by the RNC for the NodeB in advance.

This embodiment takes the base station being the NodeB as an example for illustration, but this embodiment of the present application is not limited thereto. The base station in this embodiment of the present application may also be a base station of another type, such as: an evolved base station (evolved NodeB; eNB for short). Although it is not limited in this embodiment of the present application, but the description in the following takes the base station being the NodeB as an example for illustration.

In this embodiment, an RNC may determine, according to a TTI indicator carried in an E-DCH data frame, a TTI used by a user equipment in idle state or Cell-FACH state when sending uplink data, thereby ensuring that the RNC selects and configures an appropriate TTI for the UE when the UE transits from the Cell_FACH state to the Cell_DCH state.

Figure 2:
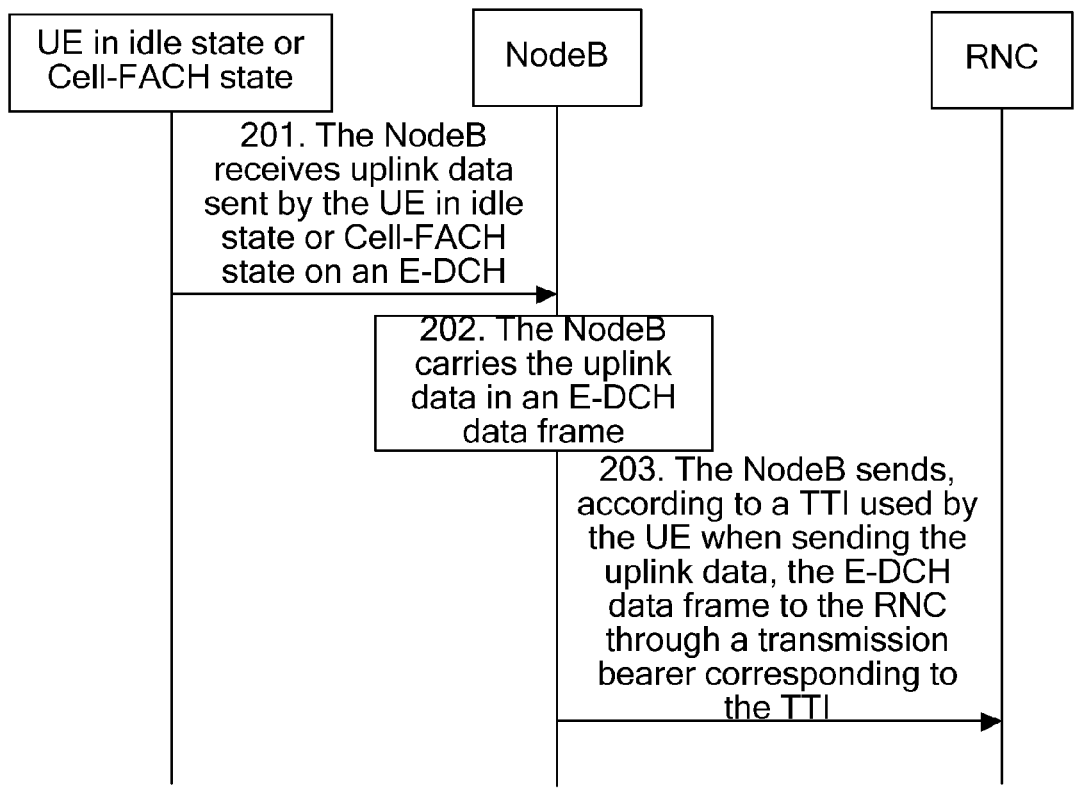
FIG. 2 is a flowchart of another embodiment of a method for determining a transmission time interval according to another embodiment of the present application.

FIG. 2 is a flow chart of a method for determining a transmission time interval according to another embodiment of the present application, and as shown in FIG. 2, the method for determining a transmission time interval may be described as follows:

201: A NodeB receives uplink data sent from a UE in idle state or Cell-FACH state on an E-DCH.

202: The NodeB carries the uplink data in an E-DCH data frame.

203: The NodeB sends, according to a TTI used by the UE when sending the uplink data, the E-DCH data frame to an RNC through a transmission bearer corresponding to the TTI, so that the RNC determines, according to the transmission bearer, the TTI used by the UE when sending the uplink data.

In this embodiment, the RNC may determine, according to the transmission bearer for sending the E-DCH data frame, the TTI used by the UE in idle state or Cell-FACH state when sending uplink data, thereby ensuring that the RNC selects and configures an appropriate TTI for the UE when the UE transits from the Cell_FACH state to the Cell_DCH state.

In the embodiment shown in FIG. 2, before 201, the NodeB needs to perform a configuration process with the RNC. In one implementation manner, the NodeB may receive a first configuration message sent from the RNC. The first configuration message carries identifiers of two uplink common media access control (MAC) flows configured by the RNC. Each of the common MAC flows corresponds to one TTI. Then, the NodeB sends a first response message to the RNC in response to the first configuration message, where the first response message carries transmission bearers allocated by the NodeB for the uplink common MAC flows. In another implementation manner, the NodeB may receive a second configuration message sent from the RNC, where the second configuration message carries an identifier of an uplink common MAC flow configured by the RNC, and a bundling mode indicator configured by the RNC for the uplink common MAC flow corresponding to the first TTI. Then, the NodeB may send a second response message to the RNC in response to the second configuration message, where the second response message carries a transmission bearer allocated by the NodeB for the uplink common MAC flow configured by the RNC.

The first configuration message may be a physical shared channel reconfiguration request message; and the first response message in response to the first configuration message may be a physical shared channel reconfiguration response message. Likewise, the second configuration message may also be a physical shared channel reconfiguration request message; and the second response message in response to the second configuration message may be a physical shared channel reconfiguration response message. Thus, the configuration process performed by the NodeB and the RNC before 201 may be a physical shared channel reconfiguration process.

Figure 3:
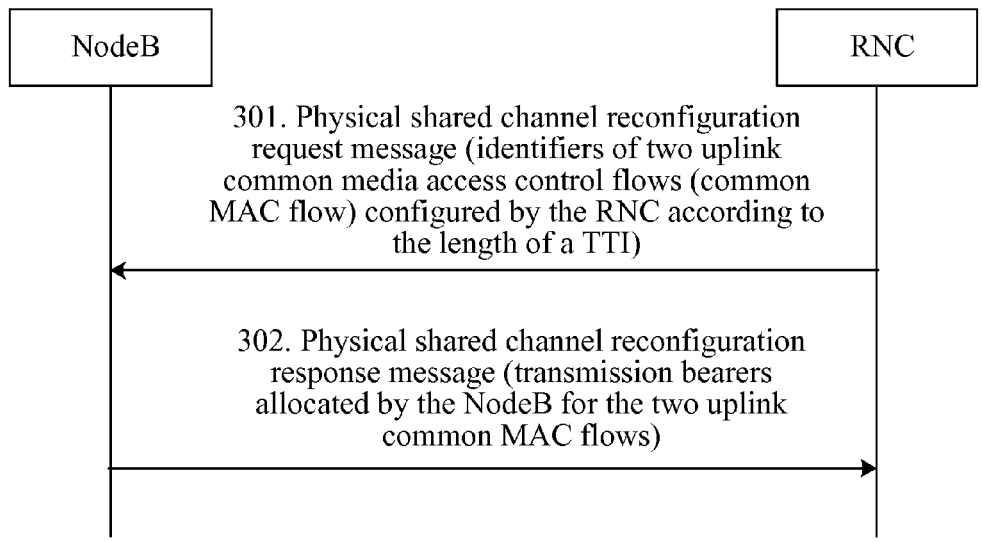
FIG. 3 is a flowchart of a possible implementation of a physical shared channel reconfiguration process according to the present application.

FIG. 3 is a flow chart of a possible implementation of the physical shared channel reconfiguration process. As shown in FIG. 3,

301: A NodeB receives a physical shared channel reconfiguration request message sent from an RNC, where the physical shared channel reconfiguration request message carries identifiers of two uplink common MAC flows configured by the RNC according to two different lengths of TTI.

302: The NodeB sends a physical shared channel reconfiguration response message to the RNC, where the physical shared channel reconfiguration response message carries transmission bearers allocated by the NodeB for the two uplink common MAC flows.

In this possible implementation, the RNC configures the two uplink common MAC flows according to the lengths of the TTI (2 ms or 10 ms), and sends the identifiers (ID) of the configured two uplink common MAC flows to the NodeB through the physical shared channel reconfiguration request message. Then, the NodeB allocates the transmission bearers for the two common MAC flows, and sends the transmission bearers allocated for the two uplink common MAC flows to the RNC through the physical shared channel reconfiguration response message. After that, the RNC stores the transmission bearers allocated by the NodeB for the two uplink common MAC flows, and a mapping between the two uplink common MAC flows and the transmission bearers. In this way, in a subsequent Iub data transmission process, after receiving uplink data sent from the UE using the 2 ms TTI, the NodeB carries the uplink data in an E-DCH data frame, and sends the E-DCH data frame to the RNC through a transmission bearer corresponding to the 2 ms TTI. After receiving the uplink data sent from the UE using the 10 ms TTI, the NodeB carries the uplink data in an E-DCH data frame, and sends the E-DCH data frame to the RNC through a transmission bearer corresponding to the 10 ms TTI. After receiving the E-DCH data frame sent from the NodeB through the transmission bearer, the RNC may determine, according to the transmission bearer, the TTI used by the UE when sending the uplink data. For example, after receiving the E-DCH data frame sent from the NodeB through the transmission bearer, if the RNC determines that the transmission bearer is the same as the transmission bearer stored by the RNC and allocated by the NodeB for the 2 ms TTI, the RNC may determine that the TTI used by the UE when sending the uplink data is 2 ms.

In this possible implementation, an RNC configures, according to the length of a TTI, two uplink common MAC flows. A NodeB allocates transmission bearers for the two uplink common MAC flows, and sends uplink data sent from a UE using a 2 ms TTI or a 10 ms TTI to the RNC through respective transmission bearers corresponding to the 2 ms TTI and the 10 ms TTI. Thus, the RNC may distinguish, according to the transmission bearer, the TTI used by the UE when sending the uplink data, thereby ensuring that the RNC selects and configures an appropriate TTI for the UE when the UE transits from the Cell_FACH state to the Cell_DCH state.

Figure 4:
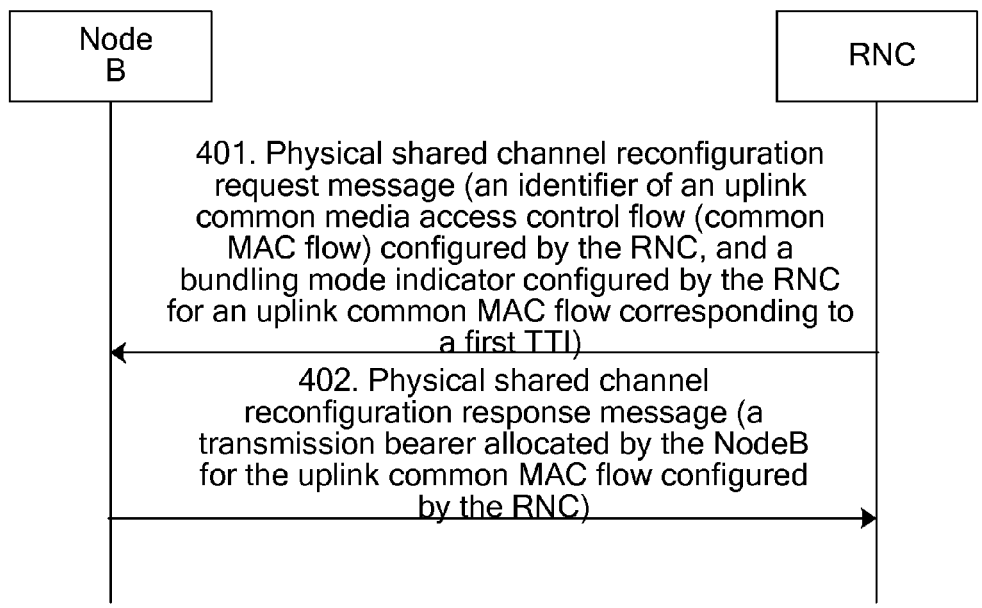
FIG. 4 is a flowchart of another possible implementation of the physical shared channel reconfiguration process according to the present application.

FIG. 4 is a flow chart of another possible implementation of the physical shared channel reconfiguration process. As shown in FIG. 4,

401: A NodeB receives a physical shared channel reconfiguration request message sent from an RNC, where the physical shared channel reconfiguration request message carries an identifier of an uplink common MAC flow configured by the RNC, and a bundling mode indicator configured by the RNC for an uplink common MAC flow corresponding to a first TTI.

The first TTI may be a 2 ms TTI or a 10 ms TTI. Although it is not limited, in the description of the following, the first TTI being the 2 ms TTI is taken as an example for illustration.

402: The NodeB sends a physical shared channel reconfiguration response message to the RNC, where the physical shared channel reconfiguration response message carries a transmission bearer allocated by the NodeB for the uplink common MAC flow configured by the RNC.

In this possible implementation, the RNC distinguishes the TTI by configuring the bundling mode indicator of the uplink common MAC flow. The RNC configures, in a configuration message, the bundling mode indicator in the corresponding uplink common MAC flow for the 2 ms TTI. After receiving the physical shared channel reconfiguration request message, the NodeB may acquire, according to the bundling mode indicator, the uplink common MAC flow supporting the 2 ms TTI. The NodeB may allocate a transmission bearer for the uplink common MAC flow carried by the physical shared channel reconfiguration request message, carry the transmission bearer, which is allocated for the uplink common MAC flow carried in the physical shared channel reconfiguration request message, in the physical shared channel reconfiguration response message, and send the response message to the RNC. After that, the RNC stores the transmission bearer allocated by the NodeB for the uplink common MAC flow, and a mapping between the uplink common MAC flow and the transmission bearer. Particularly, for the uplink common MAC flow configured with the bundling mode indicator, the RNC stores a mapping between the uplink common MAC flow, the bundling mode indicator, and the transmission bearer. In a subsequent Iub data transmission process, the NodeB sends an E-DCH data frame to the RNC through the transmission bearer that corresponds to the uplink common MAC flow configured with the bundling mode indicator, where the E-DCH data frame carries the uplink data sent from the UE using the 2 ms TTI. The RNC may determine, according to the transmission bearer corresponding to the uplink common MAC flow configured with the bundling mode indicator, and the mapping between the uplink common MAC flow, the bundling mode indicator and the transmission bearer, that the TTI used by the UE when sending the uplink data is 2 ms. Similarly, after the RNC receives an E-DCH data frame sent through a transmission bearer that corresponds to an uplink common MAC flow not configured with the bundling mode indicator, the RNC may determine, according to the transmission bearer that corresponds to the uplink common MAC flow not configured with the bundling mode indicator, that the TTI used by the UE when sending the uplink data is 10 ms.

In this possible implementation, an RNC configures a bundling mode indicator in a corresponding uplink common MAC flow for a 2 ms TTI. Subsequently, a NodeB sends uplink data to the RNC through a transmission bearer that corresponds to the uplink common MAC flow configured with the bundling mode indicator. The uplink data is sent from a UE using the 2 ms TTI. In this way, the RNC is capable of distinguishing the uplink data sent from the UE using the 2 ms TTI, so as to determine the TTI used by the UE when sending the uplink data. This ensures that the RNC selects and configures an appropriate TTI for the UE when the UE transits from the Cell_FACH state to the Cell_DCH state.

Figure 5:
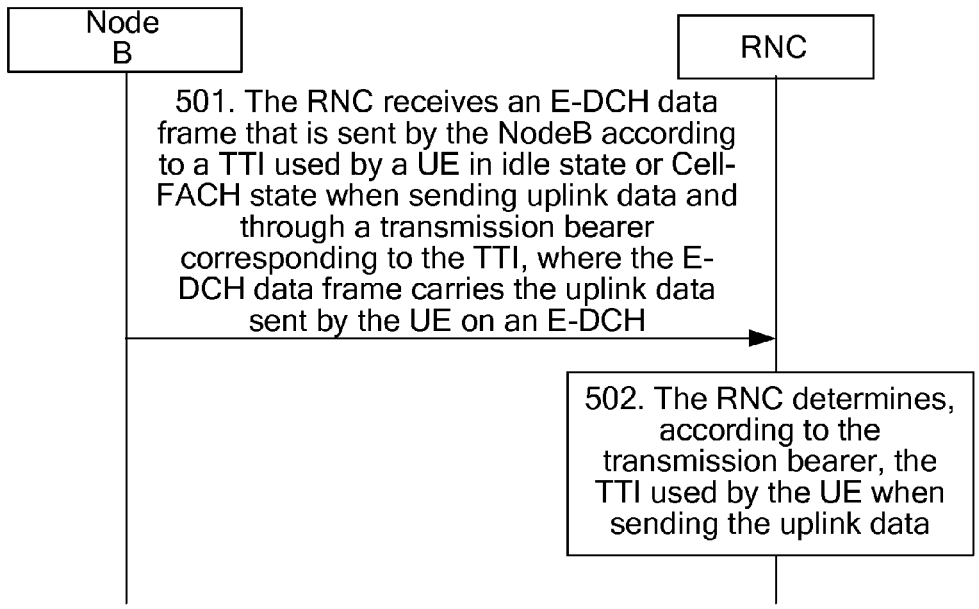
FIG. 5 is a flowchart of a method for determining a transmission time interval according to still another embodiment of the present application.

FIG. 5 is a flow chart of a method for determining a transmission time interval according to still another embodiment of the present application. As shown in FIG. 5,

501: An RNC receives an E-DCH data frame from a NodeB. The E-DCH data frame carries uplink data sent from a UE in an idle state or a Cell-FACH state. The uplink data is sent on an E-DCH according to a pre-determined TTI and through a transmission bearer corresponding to the TTI.

502: The RNC determines, according to the transmission bearer, the TTI used by the UE when sending the uplink data.

In this embodiment, before 501, the RNC also needs to perform a configuration process with the NodeB.

Referring to FIG. 3, in an implementation manner of this embodiment, the RNC may send a first configuration message to the NodeB, where the first configuration message carries identifiers of two uplink common MAC flows configured by the RNC according to two different lengths of the TTI. Then, the RNC may receive a first response message sent from the NodeB in response to the first configuration message, where the first response message carries transmission bearers allocated by the NodeB for the two uplink common MAC flows. The manner of the NodeB subsequently sending the E-DCH data frame and the manner of the RNC determining the TTI used by the UE when sending the uplink data are the same as the manners described in the implementation example shown in FIG. 3, which are not repeated herein.

Referring to FIG. 4, in another implementation manner of this embodiment, the RNC may send a second configuration message to the NodeB, where the second configuration message carries an identifier of an uplink common MAC flow configured by the RNC, and a bundling mode indicator configured by the RNC for an uplink common MAC flow corresponding to a first TTI. Then, the RNC may receive a second response message sent from the NodeB in response to the second configuration message, where the second response message carries a transmission bearer allocated by the NodeB for the uplink common MAC flow configured by the RNC.

In this implementation manner, the RNC may receive a first E-DCH data frame sent from the NodeB through a first transmission bearer that corresponds to the uplink common MAC flow configured with the bundling mode indicator. The first E-DCH data frame carries first uplink data sent from the UE using the first TTI. The RNC may determine, according to the first transmission bearer, that the UE uses the first TTI when sending the first uplink data.

The first configuration message may be a physical shared channel reconfiguration request message; and the first response message in response to the first configuration message may be a physical shared channel reconfiguration response message. The second configuration message may be a physical shared channel reconfiguration request message; and the second response message in response to the second configuration message may be a physical shared channel reconfiguration response message.

In this embodiment, an RNC may determine, according to an identifier of a transmission bearer for sending an E-DCH data frame, a TTI used by a UE in idle state or Cell-FACH state when sending uplink data, thereby ensuring that the RNC selects and configures an appropriate TTI for the UE when the UE transits from the Cell_FACH state to the Cell_DCH state.

In a method for determining a transmission time interval according to yet another embodiment of the present application, after sending an E-DCH absolute grant channel (E-AGCH) in a conflict detection stage, a NodeB may send, through NodeB application part (NBAP) signaling, an RNC a TTI used by a UE when sending uplink data. In this way, the RNC may determine, according to the TTI sent from the NodeB and an internal algorithm of the RNC, the TTI used by the UE when sending the uplink data. If the RNC needs to modify the TTI used by the UE when sending the uplink data, the RNC needs to perform reconfiguration of a radio bearer (RB). The NBAP signaling may be a first piece of signaling after the conflict detection is completed, and may be another signaling, for example: the NBAP signaling may use a radio link setup response message or a radio link setup failure message.

Those of ordinary skill in the art should understand that all or a part of the method, which is exemplified in the above embodiments of the present application, may be implemented by a program instructing relevant hardware. The program may be stored in a computer readable storage medium. When the program is run, the method is performed according to the manner as described in the embodiments of the present application. The storage medium may be any medium that is capable of storing program codes, such as a read-only memory (ROM), a random access memory (RAM), a magnetic disk or an optical disk.

Figure 6:
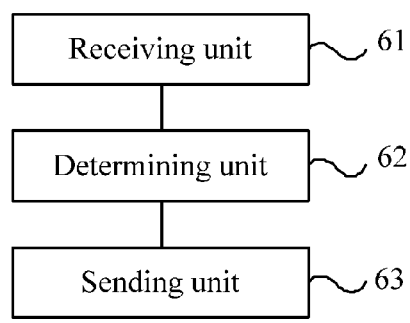
FIG. 6 is a simplified block diagram of an embodiment of a base station according to an embodiment of the present application.

FIG. 6 is a simplified block diagram of a base station according to an embodiment of the present application, and the base station in this embodiment may implement the process of the embodiment shown in FIG. 1 of the present application; as shown in FIG. 6, the base station may include: a receiving unit 61, a determining unit 62, and a sending unit 63.

The receiving unit 61 is configured to receive uplink data sent from a UE in idle state or Cell-FACH state on an E-DCH.

The determining unit 62 is configured to determine a TTI used by the UE for sending the uplink data.

The sending unit 63 is configured to carry the uplink data in an E-DCH data frame and send the E-DCH data frame to an RNC, where the E-DCH data frame carries a TTI indicator, so as to notify the RNC of the TTI used by the UE for sending the uplink data.

The base station in this embodiment may be a NodeB or a base station of another type, such as an eNB, and the type of the base station is not limited in this embodiment of the present application.

In the base station as shown in FIG. 6, after the receiving unit 61 receives uplink data sent from a UE in idle state or Cell-FACH state on an E-DCH, the determining unit 62 determines a TTI used by the UE for sending the uplink data, and the sending unit 63 carries the uplink data in an E-DCH data frame and sends the E-DCH data frame to an RNC. The E-DCH data frame carries a TTI indicator, so as to notify the RNC of the TTI used by the UE for sending the uplink data, thereby ensuring that the RNC selects and configures an appropriate TTI for the UE when the UE transits from the Cell_FACH state to the Cell_DCH state.

Figure 7:
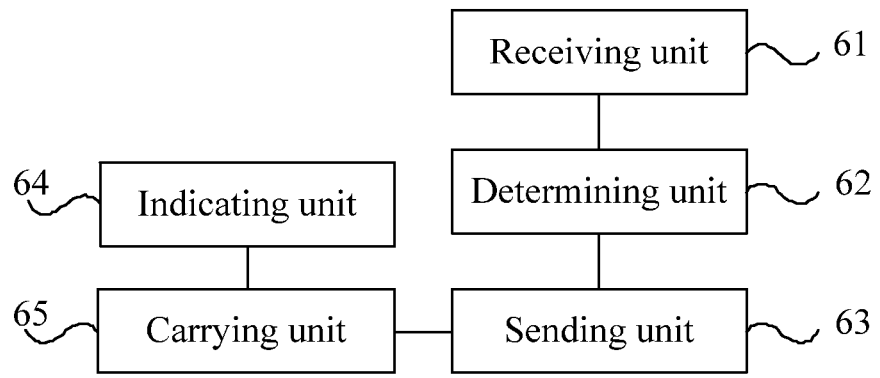
FIG. 7 is a simplified block diagram of another embodiment of a base station according to another embodiment of the present application.

FIG. 7 is a simplified block diagram of another embodiment of a base station according to the present application. Compared with the base station shown in FIG. 6, the difference lies in that, the base station shown in FIG. 7 may further include an indicating unit 64 and a carrying unit 65.

The indicating unit 64 is configured to indicate, through a New IE Flag, that a spare extension field of the E-DCH data frame includes the TTI indicator, where the TTI indicator is used to indicate that the TTI used by the UE for sending the uplink data TTI is a first TTI or second TTI.

The carrying unit 65 is configured to carry the TTI indicator in one of the following manners: in each E-DCH data frame; in each uplink E-DCH transmission process of the UE, carry the TTI indicator only in the first E-DCH data frame; and when a data buffer size in SI reported by the UE exceeds a preset threshold, carry the TTI in the E-DCH data frame.

One "uplink E-DCH transmission" refers to that the UE initiates an E-DCH transmission, acquires, through conflict contention solution, a common E-DCH used for uplink data transmission, and performs common E-DCH resources release after the uplink data transmission is completed or under control of the NodeB.

The preset threshold may be set by the NodeB according to software and hardware processing capabilities thereof, or may be configured by the RNC for the NodeB in advance.

The base station may carry a TTI indicator in an E-DCH data frame sent to an RNC, so as to notify the RNC of a TTI used by a UE for sending uplink data, thereby ensuring that the RNC selects and configures an appropriate TTI for the UE when the UE transits from the Cell_FACH state to the Cell_DCH state.

Figure 8:
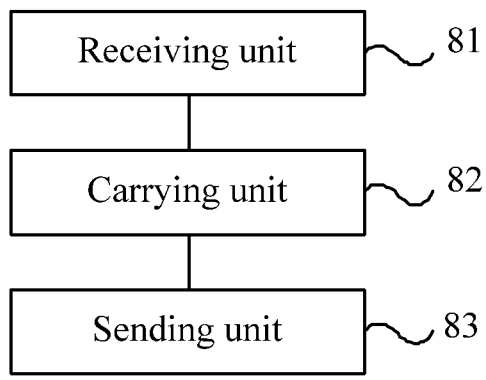
FIG. 8 is a simplified block diagram of still another embodiment of a base station according to still another embodiment of the present application.

FIG. 8 is a simplified block diagram of still another embodiment of a base station according to the present application, and the base station in this embodiment may implement the process of the embodiment shown in FIG. 2 of the present application. As shown in FIG. 8, the base station may include: a receiving unit 81, a carrying unit 82, and a sending unit 83.

The receiving unit 81 is configured to receive uplink data sent from a UE in idle state or Cell-FACH state on an E-DCH.

The carrying unit 82 is configured to carry the uplink data in an E-DCH data frame.

The sending unit 83 is configured to send, according to a TTI used by the UE when sending the uplink data, the E-DCH data frame to an RNC through a transmission bearer corresponding to the TTI, so that the RNC determines, according to the transmission bearer, the TTI used by the UE when sending the uplink data.

In an implementation manner of this embodiment, the receiving unit 81 may further receive a first configuration message sent from the RNC. The first configuration message carries identifiers of two uplink common MAC flows configured by the RNC according to different lengths of the TTI. The sending unit 83 may further configured to send a first response message to the RNC in response to the first configuration message. The first response message carries transmission bearers allocated by the base station for the two uplink common MAC flows.

In another implementation manner of this embodiment, the receiving unit 81 may further configured to receive a second configuration message sent from the RNC. The second configuration message carries an identifier of an uplink common MAC flow configured by the RNC and a bundling mode indicator configured by the RNC for an uplink common MAC flow corresponding to a first TTI The sending unit 83 may further configured to send a second response message to the RNC in response to the second configuration message. The second response message carries a transmission bearer allocated by the base station for the uplink common MAC flow configured by the RNC.

In this implementation manner, the sending unit 83 may send the E-DCH data frame to the RNC through the transmission bearer that corresponds to the uplink common MAC flow configured with the bundling mode indicator, where the E-DCH data frame carries the uplink data sent from the UE using the first TTI.

The first configuration message may be a physical shared channel reconfiguration request message. The first response message in response to the first configuration message may be a physical shared channel reconfiguration response message The second configuration message may be a physical shared channel reconfiguration request message The second response message in response to the second configuration message may be a physical shared channel reconfiguration response message.

The base station in this embodiment may be a NodeB or a base station of another type, such as an eNB. The type of the base station is not limited in this embodiment of the present application.

In the embodiment, after the receiving unit 81 receives uplink data sent from a UE in idle state or Cell-FACH state on an E-DCH, the carrying unit 82 carries the uplink data in an E-DCH data frame, and the sending unit 83 sends, according to a TTI used by the UE when sending the uplink data, the E-DCH data frame to an RNC through a transmission bearer corresponding to the TTI, so that the RNC is capable of determining, according to the transmission bearer, the TTI used by the UE when sending the uplink data, thereby ensuring that the RNC selects and configures an appropriate TTI for the UE when the UE transits from the Cell_FACH state to the Cell_DCH state.

Figure 9:
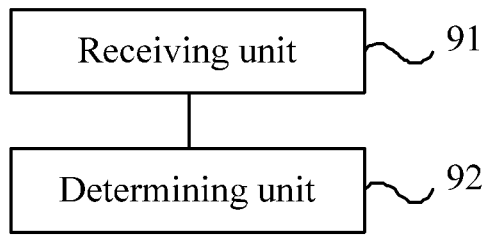
FIG. 9 is a simplified block diagram of an embodiment of a radio network controller according to an embodiment of the present application.

FIG. 9 is a simplified block diagram of an embodiment of a radio network controller (RNC) according to the present application. The RNC in this embodiment may implement the process of the embodiment shown in FIG. 5 of the present application. As shown in FIG. 9, the RNC includes a receiving unit 91 and a determining unit 92.

The receiving unit 91 is configured to receive an E-DCH data frame that is sent from a base station according to a TTI used by a UE in idle state or Cell-FACH state when sending uplink data and through a transmission bearer corresponding to the TTI. The E-DCH data frame carries the uplink data sent from the UE on an E-DCH.

The determining unit 92 is configured to determine, according to the transmission bearer, the TTI used by the UE when sending the uplink data.

The first configuration message may be a physical shared channel reconfiguration request message. The first response message in response to the first configuration message may be a physical shared channel reconfiguration response message. The second configuration message may be a physical shared channel reconfiguration request message. The second response message in response to the second configuration message may be a physical shared channel reconfiguration response message.

The RNC may determine, according to a transmission bearer for sending an E-DCH data frame, a TTI used by a UE in idle state or Cell-FACH state when sending uplink data on an E-DCH, thereby ensuring that the RNC selects and configures an appropriate TTI for the UE when the UE transits from the Cell_FACH state to the Cell_DCH state.

Figure 10:
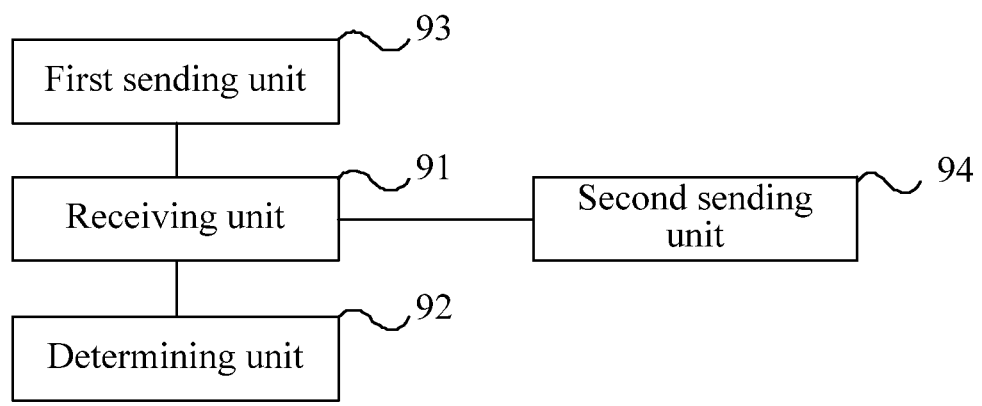
FIG. 10 is a simplified block diagram of another embodiment of a radio network controller according to another embodiment of the present application.

FIG. 10 is a schematic structural diagram of another embodiment of a radio network controller according to the present application; compared with the RNC shown in FIG. 9, the difference lies in that, in an implementation manner of this embodiment, the RNC may further include: a first sending unit 93.

The first sending unit 93 is configured to send a first configuration message to the base station. The first configuration message carries identifiers of two uplink common MAC flows configured by the RNC according to two different lengths of the TTI. At this time, the receiving unit 91 may further configured to receive a first response message sent from the base station in response to the first configuration message, where the first response message carries transmission bearers allocated by the base station for the two uplink common MAC flows.

In another implementation manner of this embodiment, the RNC may further include a second sending unit 94.

The second sending unit 94 is configured to send a second configuration message to the base station. The second configuration message carries an identifier of an uplink common MAC flow configured by the RNC, and a bundling mode indicator configured by the RNC for an uplink common MAC flow corresponding to a first TTI. At this time, the receiving unit 91 may further configured to receive a second response message sent from the base station in response to the second configuration message, where the second response message carries a transmission bearer allocated by the base station for the uplink common MAC flow configured by the RNC.

In this implementation, the receiving unit 91 may receive a first E-DCH data frame sent from the base station through a first transmission bearer that corresponds to the uplink common MAC flow configured with the bundling mode indicator, where the first E-DCH data frame carries first uplink data sent from the UE using the first TTI. At this time, the determining unit 92 may determine, according to the first transmission bearer, that the user equipment uses the first TTI when sending the first uplink data.

In this embodiment, the RNC may include a first sending unit 93 and/or a second sending unit 94. Although it is not limited in this embodiment, FIG. 10 is shown by taking the RNC including the first sending unit 93 and the second sending unit 94 as an example.

The RNC may determine, according to a transmission bearer for sending an E-DCH data frame, a TTI used by a UE in idle state or Cell-FACH state when sending uplink data on an E-DCH, thereby ensuring that the RNC selects and configures an appropriate TTI for the UE when the UE transits from the Cell_FACH state to the Cell_DCH state.

Persons skilled in the art should understand that, for convenience and simplicity of description, division of functional units is described only as an example, and in an actual application, the functions may be allocated to be implemented by different functional units according to requirements, that is, an internal structure of the device is divided into different functional units, so as to implement all or a part of functions described in the foregoing. Specific working processes of the system, device and units described in the foregoing may be obtained with reference to corresponding processes in the method embodiments, and are not repeated herein.

In several embodiments provided in the present application, it should be understood that the disclosed system, device, and method may be implemented in other ways. For example, the described device embodiments are merely exemplary. For example, the unit division is merely logical function division and can be other division in actual implementation. For example, multiple units or components can be combined or integrated into another system, or some features can be ignored or not performed. Furthermore, the shown or discussed coupling or direct coupling or communication connection may be accomplished through some interfaces, and indirect coupling or communication connection between devices or units may be electrical, mechanical, or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, various functional units according to each embodiment of the present application may be integrated in one processing module or may exist as various separate physical units, or two or more units may also be integrated in one unit. The integrated module may be implemented through hardware, or may also be implemented in a form of a software functional module.

When the integrated unit is implemented in the form of the software functional unit and sold or used as a separate product, the integrated unit may be stored in a computer readable storage medium. Therefore, the technical solution of the present application or the part that makes contributions to the prior art can be substantially embodied in the form of a software product. The computer software product is stored in a storage medium, and contains several instructions to instruct computer equipment (such as, a personal computer, a server, or network equipment) or a processor to perform all or a part of steps of the method as described in the embodiments of the present application. The storage medium includes various media capable of storing program codes, such as, a USB flash disk, a mobile hard disk, a read-only memory (ROM), a random access memory (RAM), a magnetic disk or an optical disk.

Finally, it should be noted that the above embodiments are merely provided for describing the technical solutions of the present application, but not intended to limit the present application. It should be understood by persons of ordinary skill in the art that although the present application has been described in detail with reference to the embodiments, modifications can be made to the technical solutions described in the embodiments, or equivalent replacements can be made to some technical features in the technical solutions, as long as such modifications or replacements do not depart from scope of the present application.

The invention claimed is:

1. A method for indicating a transmission time interval, comprising:
receiving, by a base station, uplink data from a user equipment device in an idle state or a cell forward access channel state on an enhanced dedicated transmission channel;
determining, by the base station, a transmission time interval used by the user equipment device for sending the uplink data; and
sending, by the base station, the uplink data in an enhanced dedicated transmission channel data frame to a radio network controller,
wherein the enhanced dedicated transmission channel data frame carries a transmission time interval indicator indicating to the radio network controller the transmission time interval used by the user equipment device for sending the uplink data;
wherein the transmission time interval used by the user equipment device is indicated to the radio network controller through an information element flag, indicating that a spare extension field of the enhanced dedicated transmission channel data frame comprises the transmission time interval indicator, and
wherein the transmission time interval is a first transmission time interval or a second transmission time interval.

2. The method according to claim 1, wherein the transmission time interval indicator is carried:
in each enhanced dedicated transmission channel data frame, or
in only the first enhanced dedicated transmission channel data frame during each uplink enhanced dedicated transmission channel transmission process of the user equipment device; or
in the enhanced dedicated transmission channel data frame when a data buffer size in scheduling information reported by the user equipment device exceeds a preset threshold.

3. A method for indicating a transmission time interval, comprising:
receiving, by a base station, a configuration message from a radio network controller, wherein the configuration message carries identifiers of two uplink common media access control flows corresponding to two different transmission time intervals;
sending, by the base station, a response message to the radio network controller in response to the configuration massage, wherein the response message indicates two transmission bearers allocated by the base station for the two uplink common media access control flows;
receiving, by the base station, uplink data from a user equipment device in an idle state or a cell forward access channel state on an enhanced dedicated transmission channel;
determining, by the base station, a transmission time interval used by the user equipment device for sending the uplink data; and
sending, by the base station, the uplink data in an enhanced dedicated transmission channel data frame to the radio network controller through a transmission bearer corresponding to the transmission time interval, so that the radio network controller determines, according to the transmission bearer, the transmission time interval used by the user equipment device for sending the uplink data.

4. The method according to claim 3, wherein the configuration message is a physical shared channel reconfiguration request message, and the response message is a physical shared channel reconfiguration response message.

5. A method for determining a transmission time interval used by a user equipment device for transmitting uplink data, comprising:
sending, by a radio network controller, a configuration message to a base station, wherein the configuration message carries identifiers of two uplink common media access control flows configured by the radio network controller corresponding to two different transmission time intervals;
receiving, by the radio network controller, a response message from the base station in response to the configuration message, wherein the response message indicates two transmission bearers allocated by the base station for the two uplink common media access control flows;
receiving, by the radio network controller, an enhanced dedicated transmission channel data frame from the base station, wherein the enhanced dedicated transmission channel data frame carries the uplink data sent by the user equipment device in an idle state or a cell forward access channel state; and
determining, by the radio network controller, a transmission time interval used by the user equipment device when sending the uplink data according to information carried in the enhanced dedicated transmission channel data frame or a transmission bearer used by the base station for transmitting the enhanced dedicated transmission channel data frame.

6. The method according to claim 5, wherein the radio network controller determines the transmission time interval used by the user equipment device when sending the uplink data according to information carried in the enhanced dedicated transmission channel data frame, and wherein the information carried in the enhanced dedicated transmission channel data frame comprises a transmission time interval indicator indicating to the radio network controller the transmission time interval used by the user equipment device for sending the uplink data.

7. The method according to claim 6, wherein the transmission time interval used by the user equipment device is indicated to the radio network controller through an information element flag, indicating that a spare extension field of the enhanced dedicated transmission channel data frame comprises the transmission time interval indicator, and wherein the transmission time interval is a first transmission time interval or a second transmission time interval.

8. The method according to claim 6, wherein the transmission time interval indicator is carried:

in each enhanced dedicated transmission channel data frame; or in only the first enhanced dedicated transmission channel data frame during each uplink enhanced dedicated transmission channel transmission process of the user equipment device; or in the enhanced dedicated transmission channel data frame when a data buffer size in scheduling information reported by the user equipment device exceeds a preset threshold.

9. A base station, comprising:

a receiver, configured to receive uplink data from a user equipment device in an idle state or a cell forward access channel state on an enhanced dedicated transmission channel;

a processor, configured to determine a transmission time interval used by the user equipment device for sending the uplink data; and a transmitter, configured to send the uplink data in an enhanced dedicated transmission channel data frame to a radio network controller, wherein the enhanced dedicated transmission channel data frame carries a transmission time interval indicator indicating to the radio network controller the transmission time interval used by the user equipment device for sending the uplink data;

wherein the transmission time interval used by the user equipment device is indicated to the radio network controller through an information element flag, indicating that a spare extension field of the enhanced dedicated transmission channel data frame comprises the transmission time interval indicator, and wherein the transmission time interval is a first transmission time interval or a second transmission time interval.

10. The base station according to claim 9, wherein the transmission time interval indicator is carried:

in each enhanced dedicated transmission channel data frame, or in only the first enhanced dedicated transmission channel data frame during each uplink enhanced dedicated transmission channel transmission process of the user equipment device; or in the enhanced dedicated transmission channel data frame when a data buffer size in scheduling information reported by the user equipment device exceeds a preset threshold.

11. A base station, comprising:

a first receiver, configured to receive a configuration message from a radio network controller, wherein the configuration message carries identifiers of two uplink common media access control flows corresponding to two different transmission time intervals;

a transmitter, configured to send a response message to the radio network controller in response to the configuration message, wherein the response message indicates two transmission bearers allocated by the base station for the two uplink common media access control flows;

a second receiver, configured to receive uplink data from a user equipment device in an idle state or a cell forward access channel state on an enhanced dedicated transmission channel; and a processor, configured to determine a transmission time interval used by the user equipment device for sending the uplink data;

wherein the transmitter is further configured to send the uplink data in an enhanced dedicated transmission channel data frame to the radio network controller through a transmission bearer corresponding to the transmission time interval, so that the radio network controller determines, according to the transmission bearer, the transmission time interval used by the user equipment device for sending the uplink data.

12. The base station according to claim 11, wherein the configuration message is a physical shared channel reconfiguration request message, and the response message is a physical shared channel reconfiguration response message.

13. A radio network controller, comprising:

a transmitter, configured to send a configuration message to a base station, wherein the configuration message carries identifiers of two uplink common media access control flows configured by the radio network controller corresponding to the two different transmission time intervals;

a receiver, configured to receive a response message from the base station in response to the configuration message, wherein the response message indicates two transmission bearers allocated by the base station for the two uplink common media access control flows; and further configured to receive an enhanced dedicated transmission channel data frame from a base station, wherein the enhanced dedicated transmission channel data frame carries uplink data sent from a user equipment device in an idle state or a cell forward access channel state; and a processor, configured to determine a transmission time interval used by the user equipment device when sending the uplink data according to information carried in the enhanced dedicated transmission channel data frame or a transmission bearer used by the base station for transmitting the enhanced dedicated transmission channel data frame.

* * * * *